Jan. 12, 1932.  R. C. SCHEMMEL  1,841,257
CONDUIT FOR ELECTRIC WIRES
Filed March 11, 1930   2 Sheets-Sheet 1

Inventor
Robert C. Schemmel,
By Depe & Kirchner
Attorneys

Jan. 12, 1932.  R. C. SCHEMMEL  1,841,257
CONDUIT FOR ELECTRIC WIRES
Filed March 11, 1930  2 Sheets-Sheet 2

Inventor
Robert C. Schemmel,
By Dyre & Kirchner
Attorneys

Patented Jan. 12, 1932

1,841,257

UNITED STATES PATENT OFFICE

ROBERT C. SCHEMMEL, OF UNION CITY, INDIANA

CONDUIT FOR ELECTRIC WIRES

Application filed March 11, 1930. Serial No. 434,966.

My invention relates to conduits for electric wires primarily adapted for installation in exposed places where appearance is a consideration.

More specifically, my present invention is in the nature of an improvement on the types of conduits shown and described in United States Letters Patent No. 1,713,302, issued to me on May 14, 1929, and in my copending application Serial No. 420,795, since matured into Patent No. 1,798,035 on March 24, 1931.

The objects of my present invention are in general to provide a conduit having the advantages of conduits constructed according to the teachings of my above identified patent and application, and having in addition certain other novel and desirable characteristics, as follows:

The conduits of my prior inventions are formed of a covering fabric folded upon itself to contain electric conducting wires. My present invention contemplates dispensing with the covering fabric and the cement or stitching, or both cement and stitching, required to maintain the fabric in its folded condition, and contemplates in lieu thereof forming the body of the conduit of a resilient material, such as rubber or a compound containing rubber. The blind nailing feature, which is characteristic of the conduits of my two prior inventions, is retained in the present invention by so forming the body that one portion constitutes a base adapted to receive tacks or the like for securing the conduit to a suitable support and by providing another portion, hinged to the base, which is adapted to overlie and conceal the tack receiving area of the base.

One object, therefore, of my present invention is to provide a conduit for electric wires comprising a unitary body of molded or extruded rubber or equivalent resilient material containing an electric conducting wire or wires embedded therein and formed with two principal parts associated in hinged relation by a connecting web of the body material, one of the parts being a base adapted to receive tacks for securing the conduit to a support, and the other part being adapted to cover and conceal the tack receiving area of the base.

Another object is to provide a conduit having all the desirable features of my prior conduits and having in addition a superior body flexibility and resiliency, to enable the structure to be disposed in operative position about short turns in the plane of the conduit without puckering or buckling of the inner edges of the curved portion.

Other and further objects and advantages will be apparent as the description proceeds.

In the accompanying drawings which form part of this application for Letters Patent, and in which the same reference characters designate the same parts in the several views, Figure 1 is a perspective view of one corner of the interior of a room showing a wall, baseboard and door frame with a length of my improved conduit applied thereto;

Figure 1:
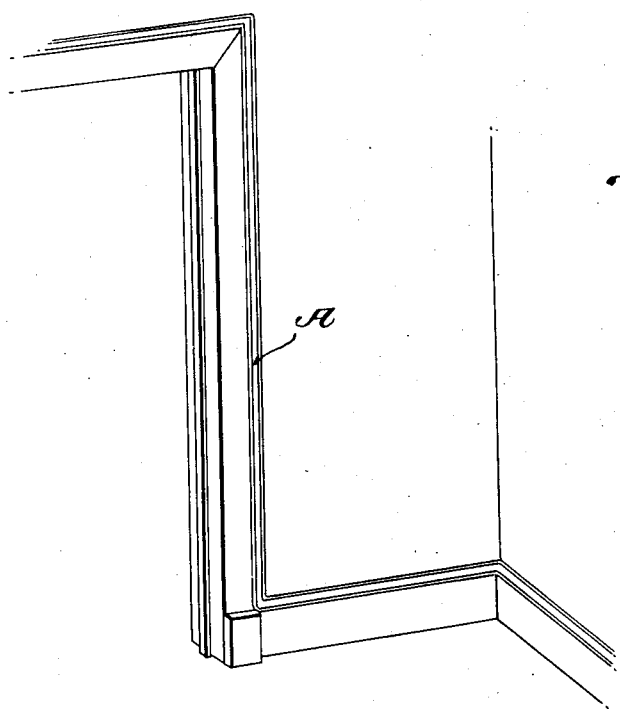

Referring now to the drawings, Figure 1 depicts a corner of the interior of a room showing a length of conduit designated A constructed in accordance with the principles of my present invention applied to the walls thereof adjacent the baseboard and door frame. The nature of the use to which the conduit is adapted to be put will be clearly apparent from this illustration.

As will be clear from the remaining figures, the conduit comprises a body of rubber, rubber compound or equivalent non-conducting, resilient material. The body is preferably of unitary construction, i. e., formed of a single piece of material, for facility of manufacture and desirability in use, but it may, if desired, be produced by cementing, stitching or otherwise securing two or more separately made portions together.

The preferred embodiment, in which the body is of unitary or one-piece construction, is formed by molding the body material while in a plastic state, or by extruding the plastic material from a suitable die.

In each of the several embodiments shown on the accompanying drawings, and in such other embodiments as will readily suggest themselves to persons skilled in the art, the conduit is provided with a base portion 1. This base portion is adapted to contact with a support 2 to which the conduit is to be secured, and for this reason the base is preferably provided with a plane under surface. A primary function of the base portion is to receive tacks 3 which pass through the base and into the support for the purpose of securing the conduit to the support. The base is therefore desirably made relatively wide and thin, as shown in all of the modified types of conduit illustrated in the drawings.

To cover and conceal the heads of the tacks 3 which are exposed on the upper surface of the base 1 when the conduit is applied to a support, I provide a covering flap 4 which, as has been explained, is preferably made integral with the base, being connected thereto by a hinging connection 5 uniting one longitudinal edge of the flap with the adjacent longitudinal edge of the base. Because of the resilience of the body material, it will be appreciated that the flap, which is formed to close down normally upon the upper surface of the base, may be temporarily lifted therefrom to enable tacks 3 to be passed through the base and into the support 2.

Electric conducting wires 6 are embedded in the body. I prefer to dispose these wires in the base portion of the conduit, where they may be widely spaced apart in the longitudinal edges thereof. To this end it is convenient to provide relatively enlarged bead portions 7 along the marginal edges of the base portion to afford an extra thickness of the body material to conveniently receive the wire.

Figure 2:
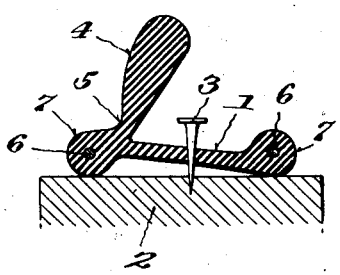
Fig. 2 is a cross sectional view of one embodiment of my invention, showing the conduit deformed during the applying operation.
Figure 3:
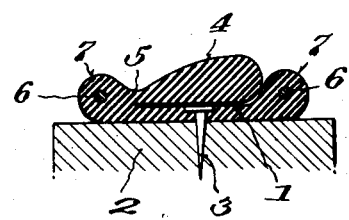
Fig. 3 is a view similar to Fig. 2, but showing the conduit in applied position.
Figure 6:
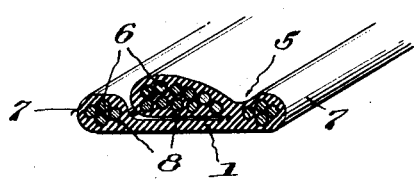
Figure 7:
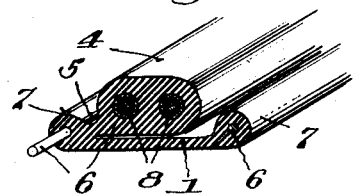
Figure 8:
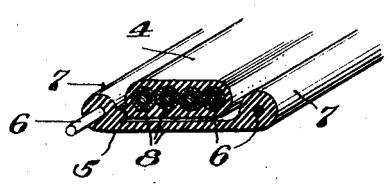
Figure 9:
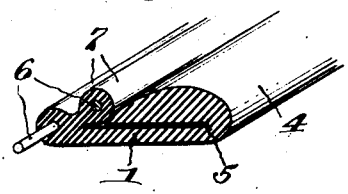

If desired, electric wires may be disposed in the covering flap 4, either with or without wires in the base. In Figures 6, 7 and 8 are shown conduits having the same general type of body as in Figures 2 and 3, but modified by the inclusion of a plurality of wires in each base bead 7, and containing also wire in the covering flap 4.

Figure 4:
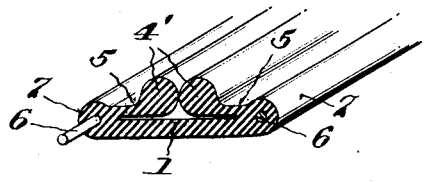
Figs. 4 to 9, inclusive, are perspective views with one end in section showing certain modified embodiments of my present invention.
Figure 5:
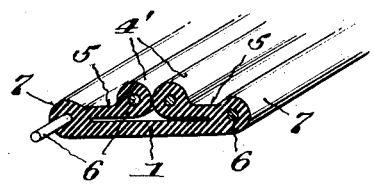

It is to be understood that the conduit body may be formed in a variety of shapes. Thus, Figures 4 and 5 show modifications in which a pair of covering flaps 4' are provided, each of reduced size, and each hinged by a connection 5 to an edge of the base 1. As in the case of the types of body shown in the other figures, the flap of Figures 4 and 5 may or may not contain electric wires.

It will be appreciated that the use of a non-conducting material such as rubber for the body of the conduit renders unnecessary the provision of special insulation immediately surrounding the individual conducting wires. However, I have found it desirable, in those types of my present invention which contain a plurality of wires in a single portion of the conduit, whether base bead or flap, to provide the wires before they are inserted in the plastic conduit body with a preformed insulating jacket of rubber, cotton, paper or the like. This insulating jacket is shown at 8 in Figures 6, 7 and 8, and is employed merely for the purpose of preventing accidental contact of the bare surfaces of adjacent metallic wires during the embedding operation.

While I have shown and described my present invention in several forms of embodiment, it is to be understood that the invention is readily capable of embodiment in other and different exemplifications. All such modifications, however, to the extent that they exhibit the principles of the invention as pointed out in the appended claims, are to be deemed within the scope and purview thereof.

Having thus described my present invention what I claim and desire to secure by Letters Patent is:

1. A conduit for electric wires comprising a body of resilient material having a base portion and another portion hinged to the base portion and covering a subbstantial part thereof, in combination with an electric wire contained in the body.

2. A conduit for electric wires comprising a unitary body of resilient material having a base portion and another portion hinged to the base portion and covering a substantial part thereof, in combination with an electric wire contained in the body.

3. A conduit for electric wires comprising a body of non-conducting resilient material having a base portion and another portion hinged to the base portion and covering a substantial part thereof, in combination with an electric wire contained in the body.

4. A conduit for electric wires comprising a body of resilient material having a base portion and another portion hinged to the base portion and covering a substantial part thereof, in combination with an electric wire contained in a longitudinal edge of the base portion.

5. A conduit for electric wires comprising a body of resilient material having a base portion, an electric wire contained in each opposite longitudinal edge of the base portion, the portion of the base between the wires constituting a tack receiving area, and another portion of the body being hinged to the base portion and adapted to overlie and conceal the tack receiving area thereof.

6. A conduit for electric wires comprising a body of resilient material having a base portion, tubular beads formed in the body along the longitudinal edges of the base portion, electric wires contained in the beads, the portion of the base between the beads constituting a tack receiving area, and another portion of the body being hinged to the base whereby it normally covers and conceals the tack receiving area of the base but is capable of being forcibly lifted therefrom.

7. A conduit for electric wires comprising a body of resilient material formed to provide a base portion and another portion adapted to cover a part of the base, in combination with an electric wire contained in the base and another electric wire contained in the portion which is adapted to overlie the base.

8. A conduit for electric wires comprising a body of resilient material formed to provide a base portion, electric wires contained in the opposite longitudinal edges of the base portion, the portion of the base between the wires constituting a tack receiving area, and another portion disposed to overlie and conceal the tack receiving area of the base portion, in combination with an electric wire contained in the base overlying portion of the body.

9. A conduit for electric wires as claimed in claim 5, in which a plurality of electric wires are contained in each opposite edge of the base portion.

10. A conduit for electric wires as claimed in claim 5, in which a plurality of electric wires are contained in each opposite edge of the base portion and an electric wire is contained in the tack concealing portion of the body.

11. A conduit for electric wires as claimed in claim 5, in which a plurality of electric wires are contained in each opposite edge of the base portion and another plurality of electric wires are contained in the tack concealing portion of the body.

In testimony whereof I affix my signature.

ROBERT C. SCHEMMEL.